United States Patent
Li et al.

(10) Patent No.: US 9,160,509 B2
(45) Date of Patent: *Oct. 13, 2015

(54) METHOD AND APPARATUS FOR TRANSMITTING SRS IN LTE TDD SYSTEM

(71) Applicant: Samsung Electronics Co., Ltd., Gyeonggi-do (KR)

(72) Inventors: Yingyang Li, Beijing (CN); Xiaoqiang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,290

(22) Filed: Feb. 18, 2015

(65) Prior Publication Data

US 2015/0163034 A1 Jun. 11, 2015

Related U.S. Application Data

(63) Continuation of application No. 14/011,346, filed on Aug. 27, 2013, now Pat. No. 9,025,429, which is a continuation of application No. 12/865,334, filed as application No. PCT/KR2009/000050 on Jan. 7, 2009, now Pat. No. 8,520,492.

(30) Foreign Application Priority Data

Feb. 5, 2008 (CN) .......................... 2008 1 0004863

(51) Int. Cl.
*H04W 72/04* (2009.01)
*H04L 5/00* (2006.01)
(Continued)

(52) U.S. Cl.
CPC ............ *H04L 5/0048* (2013.01); *H04B 7/2621* (2013.01); *H04J 3/00* (2013.01);
(Continued)

(58) Field of Classification Search
CPC .. H04L 5/0048; H04L 5/0053; H04B 7/2621; H04W 72/044
See application file for complete search history.

(56) References Cited

U.S. PATENT DOCUMENTS

| | | | |
|---|---|---|---|
| 7,957,759 | B2 | 6/2011 | Papasakellariou |
| 8,014,265 | B2 | 9/2011 | Sarkar et al. |

(Continued)

FOREIGN PATENT DOCUMENTS

| | | |
|---|---|---|
| CN | 1643842 | 7/2005 |
| CN | 1846366 | 10/2006 |
| EP | 1 471 666 | 10/2004 |

OTHER PUBLICATIONS

MCC Support, "Report of 3GPP TSG RAN WG1 #50b v1.0.0", R1-075054, 3GPP TSG RAN WG1 Meeting #51, Nov. 5-11, 2007.

(Continued)

*Primary Examiner* — Paul H Masur
(74) *Attorney, Agent, or Firm* — The Farrell Law Firm, P.C.

(57) ABSTRACT

A method and apparatus are provided for transmitting and receiving an SRS. The method includes determining a number of single-carrier frequency division multiple access (SC-FDMA) symbols in an uplink pilot time slot (UpPTS); receiving index information for an SRS; determining an SRS offset, based on the index information; and transmitting the SRS, based on the SRS offset. If the index information includes an integer from 0 to 9, if the UpPTS includes two SC-FDMA symbols, a first symbol is indicated by SRS offset 0 and a second symbol is indicated by SRS offset 1, if the UpPTS includes one SC-FDMA symbol, the first symbol is indicated by the SRS offset 1. If the index information includes the integer from 0 to 9, the SRS is transmitted twice in a period of 5 ms and the SRS offset indicated by the index information is based on an offset index table.

12 Claims, 6 Drawing Sheets

(51) Int. Cl.
- *H04W 84/04* (2009.01)
- *H04L 5/14* (2006.01)
- *H04B 7/26* (2006.01)
- *H04J 3/00* (2006.01)
- *H04L 5/02* (2006.01)

(52) U.S. Cl.
CPC .......... *H04L 5/0007* (2013.01); *H04L 5/0053* (2013.01); *H04L 5/0078* (2013.01); *H04L 5/14* (2013.01); *H04W 72/044* (2013.01); *H04W 72/0446* (2013.01); *H04W 84/04* (2013.01); *H04L 5/026* (2013.01)

(56) References Cited

U.S. PATENT DOCUMENTS

| | | |
|---|---|---|
| 8,055,301 B2 | 11/2011 | Teo et al. |
| 2005/0009551 A1 | 1/2005 | Tsai et al. |
| 2005/0123138 A1 | 6/2005 | Abe et al. |
| 2007/0104164 A1 | 5/2007 | Laroia et al. |
| 2008/0039098 A1 | 2/2008 | Papasakellariou et al. |
| 2008/0214198 A1 | 9/2008 | Chen et al. |
| 2009/0034468 A1* | 2/2009 | Muharemovic et al. ...... 370/330 |
| 2009/0046570 A1 | 2/2009 | Sarkar et al. |
| 2009/0129259 A1 | 5/2009 | Malladi et al. |
| 2009/0180435 A1 | 7/2009 | Sarkar |
| 2009/0323664 A1 | 12/2009 | Li et al. |
| 2011/0086644 A1 | 4/2011 | Dahlman et al. |
| 2011/0176480 A1 | 7/2011 | Dahlman et al. |

OTHER PUBLICATIONS

Korean Office Action dated Dec. 8, 2014 issued in counterpart application No. 10-2010-7015097.
PCT/ISA/237 Written Opinion issued in PCT/KR2009/000050, Jun. 29, 2009.
Korean Office Action dated Jun. 15, 2015 issued in counterpart application No. 10-2010-7015097.
Texas Instruments, "Uplink Reference Signal Sequence Assignments in E-UTRA", R1-073419, 3GPP TSG RAN WG1 #50, Aug. 20-24, 2007.
Chinese Office Action dated Feb. 5, 2013 issued in counterpart application No. 200810004863.0.

* cited by examiner

FIG. 5

| | Configuration | transition point period | \multicolumn{10}{c}{subframe index} |
| --- | --- | --- | --- | --- | --- | --- | --- | --- | --- | --- | --- | --- |
| | | | 0 | 1 | 2 | 3 | 4 | 5 | 6 | 7 | 8 | 9 |
| 501 | 0 | 5ms  | D | S | U | U | U | D | S | U | U | U |
| 502 | 1 | 5ms  | D | S | U | U | D | D | S | U | U | D |
| 503 | 2 | 5ms  | D | S | U | D | D | D | S | U | D | D |
| 504 | 3 | 10ms | D | S | U | U | U | D | D | D | D | D |
| 505 | 4 | 10ms | D | S | U | U | D | D | D | D | D | D |
| 506 | 5 | 10ms | D | S | U | D | D | D | D | D | D | D |
| 507 | 6 | 10ms | D | S | U | U | U | D | S | U | U | D |

METHOD AND APPARATUS FOR TRANSMITTING SRS IN LTE TDD SYSTEM

PRIORITY

This application is a Continuation Application of U.S. application Ser. No. 14/011,346, which was filed in the U.S. Patent and Trademark Office on Aug. 27, 2013, issued as U.S. Pat. No. 9,025,429 on May 5, 2015, which is a Continuation Application of U.S. application Ser. No. 12/865,334, which was filed in the U.S. Patent and Trademark Office on Jul. 29, 2010, issued as U.S. Pat. No. 8,520,492 on Aug. 27, 2013, as a National Stage Entry for International Appl. No.: PCT/KR2009/000050, which was filed on Jan. 7, 2009, and claims priority to Chinese Patent Application No. 200810004863.0, which was filed on Feb. 5, 2008, the content of each of which is incorporated herein by reference.

BACKGROUND OF THE INVENTION

1. Field of the Invention

The present invention relates to a communication system, especially to a method for transmitting SRS in an LTE communication system and an apparatus using the same.

2. Description of the Related Art

3GPP (The 3rd Generation Partner Project) standardization organization is working out a next generation of wireless communication standard which is named LTE (Long Term Evolution). In a physical layer interface, the new standard adopts OFDM (Orthogonal Frequency Division Multiplexing) technology, which is different from conventional CDMA (Code Division Multiple Access) technology. OFDMA is used in downlink and SCFDMA (Single Carrier Frequency Division Multiple Access) is used in uplink. The technology used in the new standard is effective to resist multi-path propagation, with the adoption of frequency domain equalization reducing complexity of the conventional time domain equalization, and is more suitable to bandwidth high-speed data transmission.

From a point of view of air-interface, the LTE standard techniques can be divided into two categories: a TDD (Time Division Duplex) system and an FDD (Frequency Division Duplex) system. The LTE system supports variable bandwidths. And typical bandwidths include 1.4 MHz, 3 MHz, 5 MHz, 10 MHz, 15 MHz and 20 MHz, which can meet demands of different scenarios.

FIG. 1 illustrates a physical layer frame structure for a LTE FDD system in which a length of radio frame (101) is 10 ms, consisting of ten equally sized radio sub-frames (102) of 1 ms length. Each radio sub-frame consists of two equally sized timeslots (103) of 0.5 ms length.

FIG. 2 illustrates a PHY layer frame structure for LTE TDD system. As shown in FIG. 2, a length of radio frame (201) is 10 ms, consisting of ten equally sized radio sub-frames (204) of length 1 ms. Each five continuous radio sub-frames consists a half-frame (202) of length 5 ms. Different from the LTE-FDD system, a second (211) and seventh (212) radio sub-frame in LTE-TDD radio frame are two special sub-frames. A length of the special sub-frame is 1 ms, consisting of three special slots, indicating DwPTS (205 or 208), GP (206 or 209) and UpPTS (207 or 210) respectively. The lengths of the three special slots are variable and are defined by system, and the total length is 1 ms. The length of UpPTS can be 0, 1 or 2 SCFDMA symbols. If the length of UpPTS is 2, UpPTS is used to transmit the uplink Short RACH or Uplink SRS signal or both the Short RACH and SRS signal. If the length of UpPTS is 1, UpPTS is used to transmit the uplink SRS signal. The other eight sub-frames except the special two are respectively consist of two slots (203) of length 0.5 ms.

In the LTE system, according to network scheduling, UE (User Equipment) sends an SRS (Sounding Reference Signal) to eNodeB (evolved NodeB). The SRS signal is used to: according to an analysis result of the SRS signal, eNodeB estimates a quality of channel which is used for transmitting SRS from UE to eNodeB and scheduling data according to frequency selective characteristics; eNodeB performs timing tracking for UE by analyzing the SRS signal and performs a close-loop power control. According to a current standardizing process, main conclusions for SRS transmission in LTE FDD system include: eNodeB broadcasts the SRS in a designated cell as needed and SRS is transmitted in some sub-frame in a designated cell periodically. A period is selected from {2, 5, 10, 20, 40, 80, 160, 320} ms. After the UE receives the SRS in the designated cell, the ODFM symbol resource occupied by the SRS is not used when transmitting uplink data. In order to perform the transmission of SRS, UE should receive a user-designated SRS signal transmitted from the network. The signal informs the user of the OFDM symbol resource used to transmit SRS. Currently, there is no description for transmitting the SRS of designated UE in a PHY layer specification which is accomplished in LTE.

Nowadays, a basic idea in the standard for the user-designated SRS signaling is that the signaling includes three parts: Duration, Period and Offset in which, the duration can use 1 bit to indicate that just one snapshot or infinite. The period value is selected from {2, 5, 10, 20, 40, 80, 160, 320} ms. In LTE FDD, the offset is a time between twice transmission time of each OFDM symbol of SRS from the beginning of the SRS period, and the basic unit is 1 ms. In LTE TDD, definition of offset is different from that in LTE FDD. Since in LTE TDD, SRS can be transmitted in UpPTS or the other uplink sub-frame, the uplink sub-frame may be discontinuous and UpPTS occupy two OFDM symbols at most, the offset is defined as an interval between an OFDM symbol position used to transmit SRS and an OFDM symbol position used to transmit SRS until the period of SRS transmission starts. For example, if the SRS symbol position at the period beginning is defined as 0, a symbol position used to transmit SRS is 3 means that the interval between the two symbols is 3, there is at most 2 OFDM symbol positions can be used to transmit SRS.

The manner of transmitting SRS in LTE TDD is mainly the same as that in LTE FDD. However the system structure of LTE TDD is different from of that in LTE FDD. Difference is that in LTE TDD, a half-frame of length 5 ms has both uplink sub-frame and downlink sub-frame, a number of uplink sub-frames and downlink sub-frames is configured by the network. In some configuration, a half-frame of length 5 ms at least has one uplink sub-frame (exclude UpPTS). According to a principle that only one SRS is transmitted in one uplink sub-frame, there is only one SRS transmission in every 5 ms, and the system can't achieve the SRS transmission with a 2 ms period. Therefore, the performance of SRS transmission by UE is deteriorated in a fast Time-varying channel.

Based on the difference between the LTE TDD and LTE FDD, the current configuration of the 2 ms transmission period for SRS in the LTE FDD cannot be used in the LTE TDD system.

SUMMARY OF THE INVENTION

Accordingly, the present invention is designed to address at least the problems and/or disadvantages described above and to provide at least the advantages described below.

An aspect of the invention is to provide a method for transmitting a SRS in an LTE TDD communication system. A format of SRS in LTE FDD and LTE TDD will be the same.

In accordance with an aspect of present invention, a method for wireless communication is provided. The method includes determining a number of single-carrier frequency division multiple access (SC-FDMA) symbols in an uplink pilot time slot (UpPTS); receiving index information for a sounding reference signal (SRS); determining an SRS offset, based on the index information; and transmitting the SRS, based on the SRS offset. If the index information includes an integer from 0 to 9, if the UpPTS includes two SC-FDMA symbols, a first symbol is indicated by SRS offset 0 and a second symbol is indicated by SRS offset 1, if the UpPTS includes one SC-FDMA symbol, the first symbol is indicated by the SRS offset 1. If the index information includes the integer from 0 to 9, the SRS is transmitted twice in a period of 5 ms and the SRS offset indicated by the index information is based on:

| Index | Offset |
|-------|--------|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

In accordance with another aspect of present invention, a method for wireless communication is provided. The method includes transmitting index information for a sounding reference signal (SRS); and receiving the SRS, based on an SRS offset that is determined based on the index information. If the index information includes an integer from 0 to 9, if an uplink pilot time slot (UpPTS) includes two single-carrier frequency division multiple access (SC-FDMA) symbols, a first symbol is indicated by SRS offset 0 and a second symbol is indicated by SRS offset 1, if the UpPTS includes one SC-FDMA symbol, the first symbol is indicated by the SRS offset 1. If the index information includes the integer from 0 to 9, the SRS is received twice in a period of 5 ms and the SRS offset indicated by the index information is based on:

| Index | Offset |
|-------|--------|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

In accordance with another aspect of present invention, an apparatus for wireless communication is provided. The apparatus includes a transceiver configured to transmit and receive signals; and a controller configured to determine a number of single-carrier frequency division multiple access (SC-FDMA) symbols in an uplink pilot time slot (UpPTS), to determine a sounding reference signal (SRS) offset, based on the index information, to control the transceiver to receive index information for an SRS, and to control the transceiver to transmit the SRS, based on the SRS offset. If the index information includes an integer from 0 to 9, if the UpPTS includes two SC-FDMA symbols, a first symbol is indicated by SRS offset 0 and a second symbol is indicated by SRS offset 1, if the UpPTS includes one SC-FDMA symbol, the first symbol is indicated by the SRS offset 1. If the index information includes the integer from 0 to 9, the SRS is transmitted twice in a period of 5 ms and the SRS offset indicated by the index information is based on:

| Index | Offset |
|-------|--------|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

In accordance with another aspect of present invention, an apparatus for wireless communication is provided. The apparatus includes a transceiver configured to transmit and receive signals; and a controller configured to control the transceiver to transmit index information for a sounding reference signal (SRS), and to receive the SRS, based on an SRS offset that is determined based on the index information. If the index information includes an integer from 0 to 9, if an uplink pilot time slot (UpPTS) includes two single-carrier frequency division multiple access (SC-FDMA) symbols, a first symbol is indicated by SRS offset 0 and a second symbol is indicated by SRS offset 1, if the UpPTS includes one SC-FDMA symbol, the first symbol is indicated by the SRS offset 1. If the index information includes the integer from 0 to 9, the SRS is received twice in a period of 5 ms and the SRS offset indicated by the index information is based on:

| Index | Offset |
|-------|--------|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 5 is a schematic diagram illustrating seven types of uplink and downlink configuration in an LTE TDD system;

DETAILED DESCRIPTION OF EMBODIMENTS OF THE INVENTION

Figure 1:
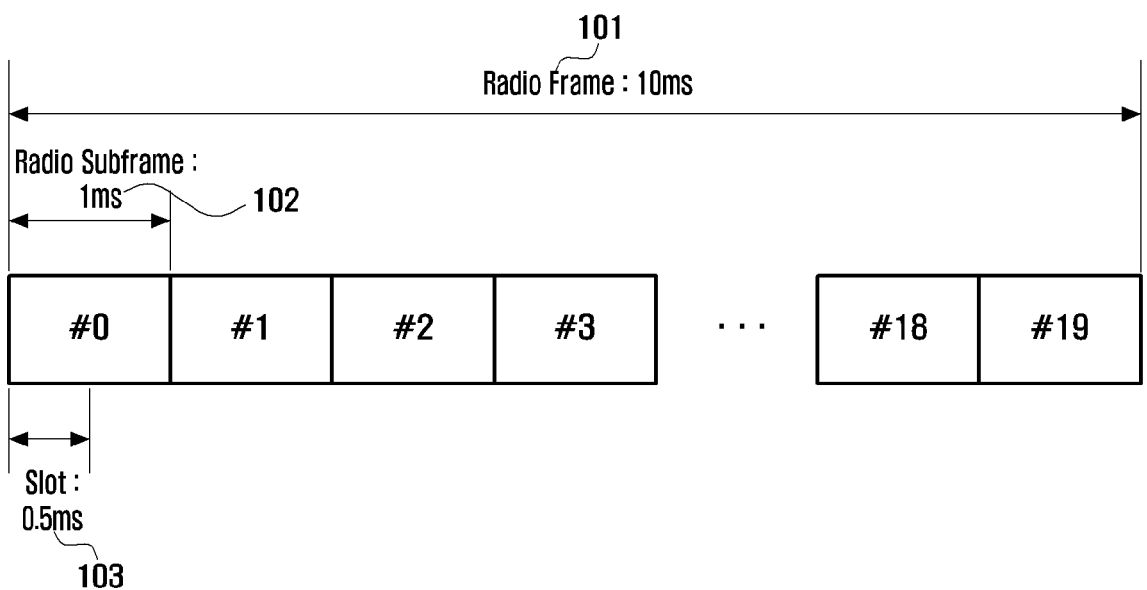
FIG. 1 is a schematic diagram illustrating a frame structure in an LTE FDD system.
Figure 2:
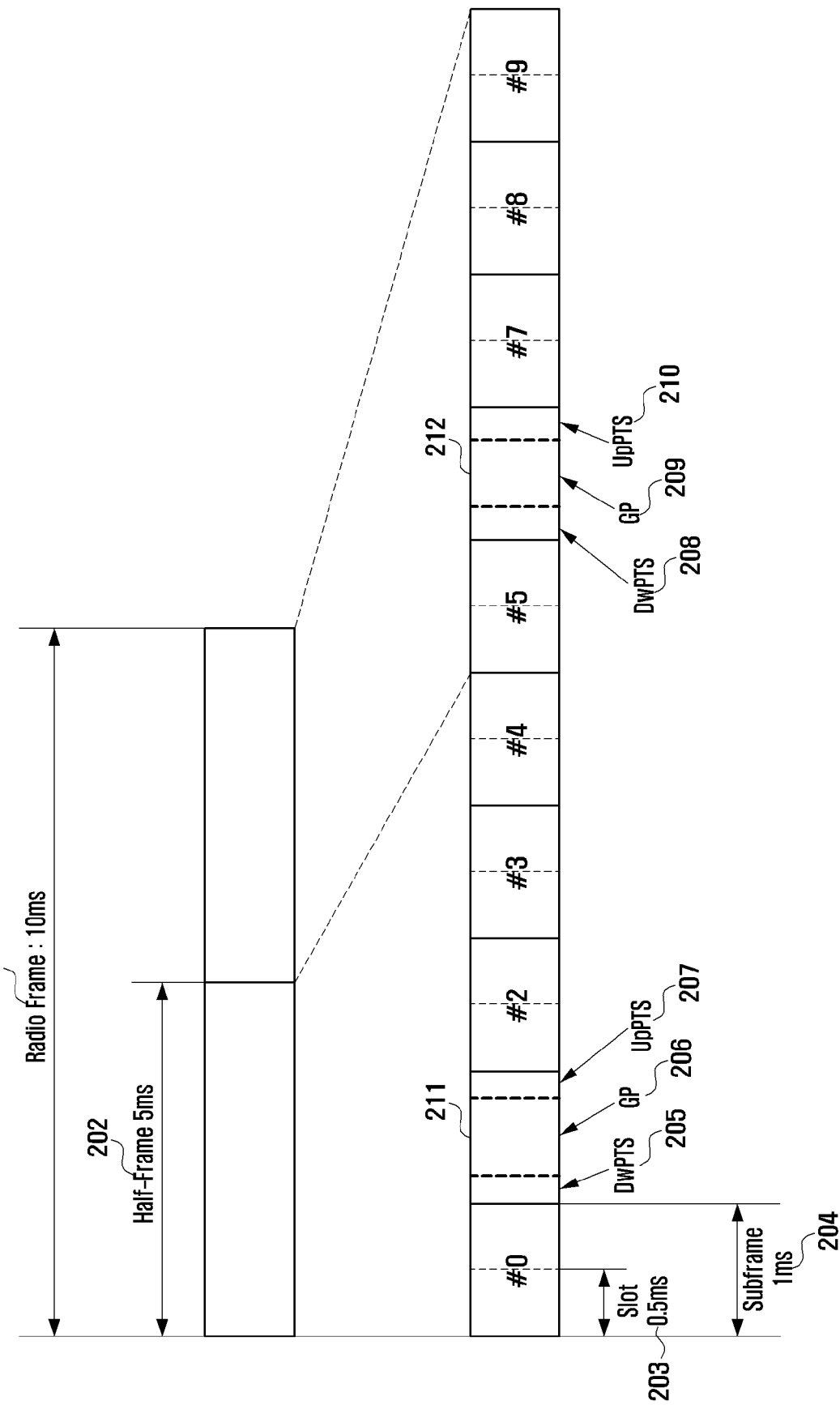
FIG. 2 is a schematic diagram illustrating a frame structure in an LTE TDD system.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

For the LTE FDD system, since the maximum period of SRS is among {2, 5, 10, 20, 40, 80, 160, 320} ms, in order to achieve a maximum flexibility, for an arbitrary period, a possible SRS offset is select from {0, 1, . . . , Period−1}. Therefore, for the LTE FDD, the SRS of the designated user includes 2+5+10+20+40+80+160+320=637 indexes. This method provides a maximum flexibility, and needs 10 bits to present 637 indexes. Since 1024 pieces of information may be indicated by 10 bits, the other 1024−637=387 indexes are reserved for various purpose.

When the period is 320 ms, providing at most 320 offsets is unnecessary, the 10 bits may be not the most reasonable. In this condition, the number of indexes can decrease with the decrease of the offset range, so that a total number of bits needed decreases and the number of reserved indexes decreases.

UE receives an index N indicating a period of SRS transmission from base station.

For a LTE TDD system, the period value of SRS is also among (2, 5, 10, 20, 40, 80, 160, 320} ms, the design of offset is the same as in LTE FDD except that when the period is 2 ms and 5 ms. However compared with LTE FDD the difference is that in LTE TDD, the uplink sub-frame isn't always continuous, so that there doesn't have a complete period of 2 ms. For this reason, the period of 2 ms for LTE should have some special design. Currently, there are seven uplink and downlink configurations supported in LTE TDD, illustrated in FIG. 5 (501-507). A group of corresponding SRS indexes is defined to indicate the SRS index of designated user of 2 ms period. For configuration of 0 (501), 1 (502), 2 (503) and 6 (507), all of the indexes indicate that in a 5 ms half-frame period or 5 ms frame period, two continuous or arbitrary OFDM positions in logical from the OFDM symbols which are configured to transmit SRS are selected, and the designated user is indicated to use this position to transmit SRS. For configuration of 3 (504), 4 (505) and 5 (506), all of the indexes indicate that in a 10 ms frame period, two continuous or arbitrary OFDM positions in logical from the OFDM symbols which are configured to transmit SRS are selected, and the designated user is indicated to use this position to transmit SRS. The definition mentioned is used to inform the designated user that how to select the OFDM position used for SRS transmission in the 2 ms period.

Considering that in LTE TDD system, there are at most 5 OFDM symbols used to transmit SRS in 5 ms half-frame, which include two symbols in UpPTS, and three OFDM symbols in uplink sub-frame 2, 3 and 4. Thus, if the two selected symbols are arbitrary, the number of choice is C(5, 2)=10 (C presents for combination) with 10 corresponding indexes. Ten indexes need to correspond with the concrete OFDM symbols. Any correspondence will be used without departing from the spirit and scope of the present invention. For example the correspondence may be selected randomly, or when making correspondence, assigning the indexes with high priority to a former or latter position. One consideration about priority is considering a situation with 1 or 2 UpPTS symbol first. There are four situations (a last OFDM symbol and a first OFDM symbol isn't logically continuous) or five situations (a last OFDM symbol and a first OFDM symbol is logically continuous) if select two continuous OFDM symbols, so that four or five indexes are needed for indicating.

If the period is 5 ms, a special case in LTE TDD is that, for configuration 3 (504), 4 (505) and 5 (506), there is no uplink resource in the second half-frame in 10 ms frame. So that SRS can't be transmitted in the second half-frame. If the two continuous or arbitrary OFDM positions in logical are selected from the OFDM symbols configured to transmit SRS in the first half-frame, the definition is the same as in LTE TDD with 2 ms period. Therefore, in order to simplify the system design, 5 ms period isn't suitable for configuration 3, 4 and 5 in LTE TDD in present invention.

Compared with LTE FDD, in some situation, period of 2 ms and 5 ms aren't supported, so that the period of 2 ms and 5 ms is redefined to achieve a similar function as in LTE FDD.

Based on the redefined method to redefine the 2 ms period of configuration 0 to 2 and 6, an actual period is 5 ms, that is, two SRS symbols are occupied every 5 ms. In order to redefine the 2 ms period of configuration 3 to 5, the actual period is 10 ms, that is, two SRS symbols are occupied every 10 ms. In fact, the redefinition described above for 2 ms and 5 ms period for LTE TDD can be used in system configuration and makes the comparison with LTE FDD easy. Sometimes, the system doesn't support the period of 2 ms and 5 ms, and directly define to configure two SRS in 5 ms or 10 ms. The essence of these two methods is the same. The essence of the method is the same as the redefinition of period. More specifically for the second method, SRS period of 2 ms isn't supported in LTE TDD. For configuration 3 to 5, SRS period of 5 ms isn't supported. However, two SRS symbols can be configured every half-frame (every 5 ms), such as for configuration 0 to 2 and 6. Also, two SRS symbols can be configured in the first half-frame (every 10 ms) in radio frame, such as for configuration 3 to 5. The configuration of two SRS symbols in every half-frame can use a similar method compared with the method used in the redefinition of 2 ms and 5 ms period described above, so to speak, a completely flexible configuration needs to indicate C(5,2)=10 choices, or decrease the number of selection by restrict the method of configuration, the invention is not limited.

Furthermore, the redefinition of 2 ms period described above is to configure two SRS symbols in a half-frame (5 ms), that is, it is reasonable to define that 2 ms period isn't support in LTE TDD system and two SRS symbols is configured every half-frame (5 ms). For configuration 0 to 2 and 6, the actual period is 5 ms, that's to say that, two SRS symbols are occupied every 5 ms. For configuration 3 to 5, the actual period is 10 ms, that's to say that, two SRS symbols are occupied every 10 ms. The configuration of two SRS symbols in every half-frame can use a similar method compared with the method used in the redefinition of 2 ms and 5 ms period described above, that is, a flexible configuration needs to indicate C(5,2)=10 choices, or decrease the number of selection by limiting the method of configuration, the invention is not limited.

After the UE receives information N indicating SRS transmission from the network, when the SRS period indicated by N is less than or equal to the number of OFDM symbols configured to transmit SRS in the entire cell in a period, the offset can be calculated as follows:

If the range of N is from 0 to 320/f−1, the period indicated by N is 320 ms, then the SRS is transmitted by using offset N*f.

If the range of N is from 320/f to 320/f+160/m−1, the period indicated by N is 160 ms, then the SRS is transmitted by using offset N−320/f*m.

If the range of N is from 320/f+160/m to 320/f+160/m+80/t−1, the period indicated by N is 80 ms, then the SRS is transmitted by using offset N−320/f−160/m*t.

If the range of N is from 320/f+160/m+80/t to 320/f+160/m+80/t+40/n−1, the period indicated by N is 40 ms, then the SRS is transmitted by using offset N−320/f−160/m−80/t*n.

If the range of N is from 320/f+160/m+80/t+40/n to 320/f+160/m+80/t+40/n+20/p−1, the period indicated by N is 20 ms, then the SRS is transmitted by using offset N−320/f−160/m−80/t−40/n*p.

If the range of N is from 320/f+160/m+80/t+40/n+20/p to 320/f+160/m+80/t+40/n+20/p+10/x−1, the period indicated by N is 10 ms, then the SRS is transmitted by using offset N−320/f−160/m−80/t−40/n−20/p*x.

If the range of N is from 320/f+160/m+80/t+40/n+20/p+10/x to 320/f+160/m+80/t+40/n+20/p+10/x+5−1, the period indicated by N is 10 ms, then the SRS is transmitted by using offset N−320/f−160/m−80/t−40/n−20/p−10/x.

Where f, m, t, n can be 1, 2, 4, 8; p can be 1, 2, 4, 5, 10; x can be 1, 2, 5; M presents a number of OFDM symbol configured to transmit SRS in a period in the whole cell indicated by information N. The value of f, m, t, n and M need to be set statically in system specification. "−" is a symbol for subtraction.

After UE receives the information N indicating the SRS transmission from network, when the SRS period indicated by N is greater than the number of OFDM symbols configured to transmit SRS in the entire cell in a period, the offset can be calculated as follows:

If the range of N is from 0 to M−1, the period indicated by N is 320 ms, then the SRS is transmitted by using offset N;

Reserved by the system if the range of N is from M to 320/f−1;

If the range of N is from 320/f to 320/f+M−1, the period indicated by N is 160 ms, then the SRS is transmitted by using offset N−320/f;

Reserved by the system if the range of N is from M to 320/f+160/m−1;

If the range of N is from 320/f+160/m to M−1, the period indicated by N is 80 ms, then the SRS is transmitted by using offset N−320/f−160/m;

Reserved by the system if the range of N is from M to 320/f+160/m+80/t−1;

If the range of N is from 320/f+160/m+80/t to M−1, the period indicated by N is 40 ms, then the SRS is transmitted by using offset N−320/f−160/m−80/t;

Reserved by the system if the range of N is from M to 320/f+160/m+80/t+40/n−1;

If the range of N is from 320/f+160/m+80/t+40/n to M−1, the period indicated by N is 20 ms, then the SRS is transmitted by using offset N−320/f−160/m−80/t−40/n;

Reserved by the system if the range of N is from M to 320/f+160/m+80/t+40/n+20/p−1;

If the range of N is from 320/f+160/m+80/t+40/n+20/p to M−1, the period indicated by N is 10 ms, then the SRS is transmitted by using offset N−320/f−160/m−80/t−40/n−20/p;

Reserved by the system if the range of N is from M to 320/f+160/m+80/t+40/n+20/p+10/x−1;

If the range of N is from 320/f+160/m+80/t+40/n+20/p+10/x to M−1, the period indicated by N is 5 ms, then the SRS is transmitted by using offset N−320/f−160/m−80/t−40/n−20/p−10/x; AND Reserved if the range of N is from M to 320/f+160/m+80/t+40/n+20/p+10/x+5−1.

Where f, m, t, n can be 1, 2, 4, 8; p can be 1, 2, 4, 5, 10; x can be 1, 2, 5; M presents the number of OFDM symbol configured to transmit SRS in a period in the whole cell indicated by the information N. The value of f, m, t, n and M need to be set statically in system specification. "−" is a symbol for subtraction.

The design method described above is the most basic SRS design for the designated user. The invention considers the coherence of signal format in LTE FDD and LTE TDD, the detailed principle is as follows: firstly, the information bits indicating the SRS transmission of designated user in LTE FDD and LTE TDD is the same. For example, 10 bits or 9 bits are used to inform. Next, the reserved index occupies and only occupies one section of continuous indexes both in LTE FDD and LTE TDD.

According to the design principle of LTE TDD compatible with of LTE FDD, the SRS transmission signal for designated user can refer to a table below:

TABLE 1

Indexes of SRS signal

| index | period | offset | description |
|---|---|---|---|
| 0-4 | 5 | 0-4 | Configuration 3, 4 and 5 are reserved in LTE TDD |
| 5-14 | 10 | 0-9 | |
| 15-34 | 20 | 0-19 | |
| 35-74 | 40 | 0-39 | |
| 75-154 | 80 | 0-79 | |
| 155-314 | 160 | 0-159 | |
| 315-634 | 320 | 0-319 | |
| 635-1023 | 2 | 0-1 in FDD 0-9 for TDD | indexes 637-1023are reserved in LTE FDD indexes 645-1023are reserved in LTE TDD The offset in LTE TDD is the index of method, using which to select two SRS symbols from half-frame |

Follow table is used to describe by using the same design principle:

TABLE 2

Indexes of SRS signal

| Index | Period | Offset | Description |
|---|---|---|---|
| 0-319 | 320 | 0-319 | |
| 320-479 | 160 | 0-159 | |
| 480-559 | 80 | 0-79 | |
| 560-599 | 40 | 0-39 | |
| 600-619 | 20 | 0-19 | |
| 620-629 | 10 | 0-9 | |
| 630-634 | 5 | 0-4 | Configuration 3, 4 |

TABLE 2-continued

| | Indexes of SRS signal | | |
|---|---|---|---|
| Index | Period | Offset | Description |
| 635-1023 | 2 | 0-1 in FDD 0-9 for TDD | and 5 are reserved in LTE TDD indexes 637-1023 are reserved in LTE FDD indexes 645-1023 are reserved in LTE TDD The offset in LTE TDD is the index of method, using which to select two SRS symbols from half-frame |

Considering the period value could be ordered from small to large, a table uniformly describing the indexes of SRS signal for LTE TDD and LTE FDD could be obtained:

TABLE 3

| | Indexes of SRS signal | | |
|---|---|---|---|
| Index | Period | Offset | Description |
| 0-9 | 2 | 0-1: LTE FDD 0-9: LTE FDD | 2-9 reserved in LTE FDD The offset in LTE TDD is the index of method, using which to select two SRS symbols from half-frame |
| 10-14 | 5 | 0-4 | Configuration 3, 4 and 5 are reserved in LTE TDD |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-1023 | 320 | 0-1 in FDD 0-9 for TDD | indexes 645-1023 are reserved in LTE TDD |

In order to ensure a coherence of design for LTE FDD and LTE TDD, a degree of flexibility may be sacrificed in LTE TDD. If period is 2 ms, the number of indexes is limited to 2 in LTE TDD, so that the number of indexes in LTE FDD and LTE TDD is exactly the same. This is shown in Table 4:

TABLE 4

| | Indexes of SRS signal | | |
|---|---|---|---|
| Index | Period | Offset | Description |
| 0-1 | 2 | 0-1 | |
| 2-6 | 5 | 0-4 | Configuration 3, 4 and 5 are reserved in LTE TDD |
| 7-16 | 10 | 0-9 | |
| 17-36 | 20 | 0-19 | |
| 37-76 | 40 | 0-39 | |
| 77-156 | 80 | 0-79 | |
| 157-316 | 160 | 0-159 | |
| 317-1023 | 320 | 0-1 in FDD 0-9 for TDD | indexes 637-1023 are reserved |

In the above method, considering the coherence for LTE FDD and LTE TDD, the configuration in both systems should keep the same. The detailed method for LTE TDD is optimized. If using different table for LTE FDD and LTE TDD is allowed, table 1 to 4 could just used in LTE TDD, and another design for LTE FDD is achievable. The mainly difference is that in LTE FDD, only two indexes are occupied in 2 ms period.

The above description is the SRS configuration method based on the redefinition of 2 ms and 5 ms period in LTE TDD. For redefinition of the 2 ms period of configuration 0 to 2 and 6, the actual period is 5 ms. For redefinition of the 2 ms period of configuration 3 to 5, the actually period is 10 ms. So that when using the period value of SRS for calculation, for the 2 ms period of configuration 0 to 2 and 6, 5 ms is used as the period, and for the 2 ms period of configuration 3 to 5, 10 ms is used as the period.

If the redefinition of 2 ms and 5 ms period in LTE TDD is not used, in some situation without supporting 2 ms and 5 ms period, the system defines that two SRS is configured in 5 ms or 10 ms. When using the period of SRS, the value of period is used to calculate directly. Table 5 and table 6 are two possible detailed configuration methods. The period value in table 5 or table 6 is an actual period value. It is assumed that all of C (5,2)=10 methods of selecting two SRS symbols in half-frame are supported.

In table 5, when the index is between 0 and 9, two SRS are configured in a period of 5 ms. The corresponding offset 0 to 9 is the indexes for the methods for selecting two SRS symbols from half-frame substantially. When the index is between 10 and 14, one SRS is configured in a period of 5 ms, and the offset presents a position of assigned SRS. When the index is between 15 and 24, two SRS are configured in a period of 10 ms. The corresponding offset 0 to 9 is the index for the methods for selecting two SRS symbols from half-frame substantially. When the index is between 25 and 34, one SRS is configured in a period of 10 ms, and the offset presents the position of assigned SRS.

TABLE 5

| | Indexes of SRS signal | | |
|---|---|---|---|
| Index | Period | Offset | Description |
| 0-9 | 5 | 0-9 | The offset is the index of method, using which to select two SRS symbols from half-frame |
| 10-14 | 5 | 0-4 | |
| 15~24 | 10 | 0~9 | The offset is the index of method, using which to select two SRS symbols from half-frame |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

Table 6 has the same effect as that of Table 5 except for an order of rows to implement a new embodiment. The invention is limited to the order of SRS period in the table.

In table 6, when the index is between 0 and 9, two SRS are configured in a period of 5 ms. The corresponding offset 0 to 9 is the index of the methods, for selecting two SRS symbols from half-frame substantially. When the index is between 10 and 19, two SRS are configured in a period of 10 ms. The corresponding offset 0 to 9 is the index of the methods for selecting two SRS symbols from half-frame substantially. When the index is between 20 and 24, one SRS is configured in a period of 5 ms, and the offset presents the position of assigned SRS. When the index is between 25 and 34, one SRS is configured in a period of 10 ms, and the offset value presents the position of assigned SRS.

TABLE 6

Indexes of SRS signal

| Index | Period | Offset | Description |
|---|---|---|---|
| 0-9 | 5 | 0-9 | The offset is the index of method, using which to select two SRS symbols from half-frame |
| 10-19 | 10 | 0-9 | The offset is the index of method, using which to select two SRS symbols from half-frame |
| 20~24 | 5 | 0~4 | |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

If the redefinition of 2 ms and 5 ms period in LTE TDD is not used, the period of 2 ms not supported in LTE TDD is defined and two SRS are configured every half-frame (5 ms). So that, when using the period value of SRS for calculating, for configuration 0 to 2 and 6, 5 ms is used as the period, for configuration 3 to 5, 10 ms is used as the period. Table 6 is a possible configuration method. It is assumed that all the C(5, 2)=10 methods used to select two SRS symbols in half-frame are supported.

In table 7, when the index is between 0 and 9, two SRS are configured in a period of 5 ms. The corresponding offset 0 to 9 is the index of the methods for selecting two SRS symbols from half-frame. When the index is between 10 and 14, one SRS is configured in a period of 5 ms, and the offset indicates the position of the assigned SRS. When the index is between 15 and 24, one SRS is configured in a period of 10 ms, and the offset presents the position of assigned SRS.

TABLE 7

Indexes of SRS signal

| Index | Period | Offset | Description |
|---|---|---|---|
| 0-9 | 5 | 0-9 | The offset is the index of method, using which to select two SRS symbols from half-frame |
| 10-14 | 5 | 0-4 | |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-644 | 320 | 0-319 | |
| 645-1023 | | | Reserved |

C(5,2)=10 indexes are used to achieve complete flexibility for transmitting two SRS in a period. A mapping method from the indexes to two selected SRS symbol is as follows: when UpPTS includes two SRS symbols, a first SRS symbol is indicated by SRS sub-frame offset 0 and a second SRS symbol is indicated by SRS sub-frame offset 1. When UpPTS includes one SRS symbol, the SRS symbol is indicated by SRS sub-frame offset 1. The SRS symbol in the other sub-frame is indicted by the corresponding offset (that is, 2, 3 or 4). Therefore, a possible mapping method from C(5,2)=10 indexes to two selected SRS symbols is shown as follows:

TABLE 8

Mapping from 10 indexes to two selected SRS symbols

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4 |

The network uses an RRC signal to transmit the SRS signal generated in step 1.

The generated SRS information is mapped to transmission channel and physical channel, then transmitted to UE through the antenna after being processed accordingly.

Figure 3:
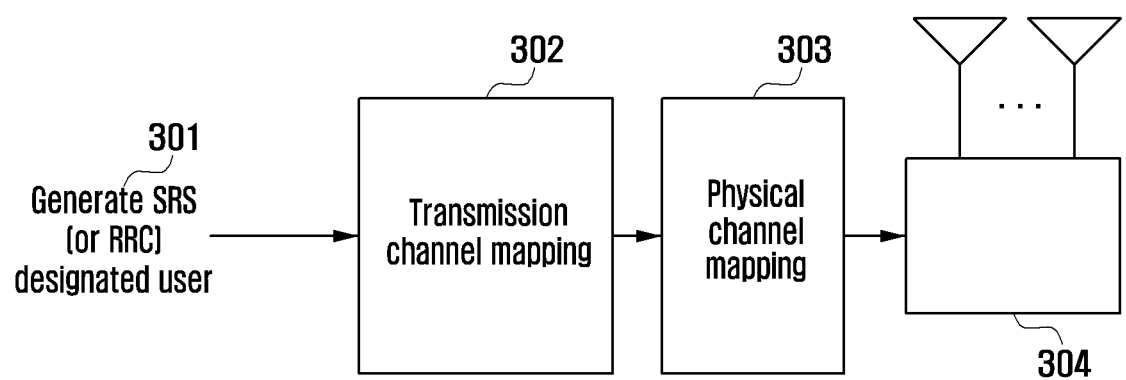
FIG. 3 is a schematic diagram illustrating the SRS transmission process of designated user in an LTE system.

An apparatus for transmitting SRS of designated user is illustrated in FIG. 3. The apparatus includes a SRS generator module (301) for generating the SRS information. The SRS information is mapped to a transmission channel module (302), passed to a physical channel mapping module (303), and the SRS of designated user is transmitted through the antenna (304).

Figure 4:
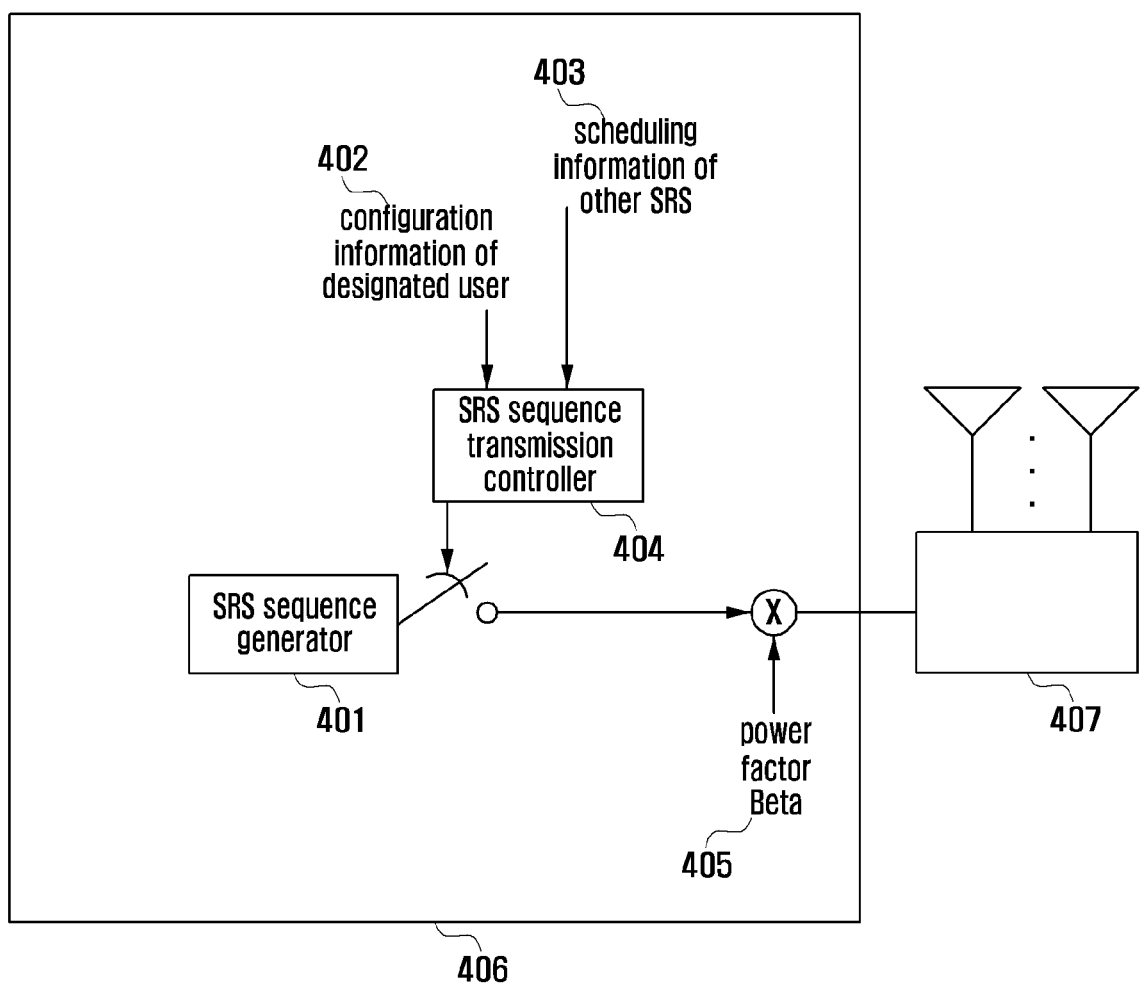
FIG. 4 is a schematic diagram illustrating an SRS transmission process of LTE UE.
Figure 6:
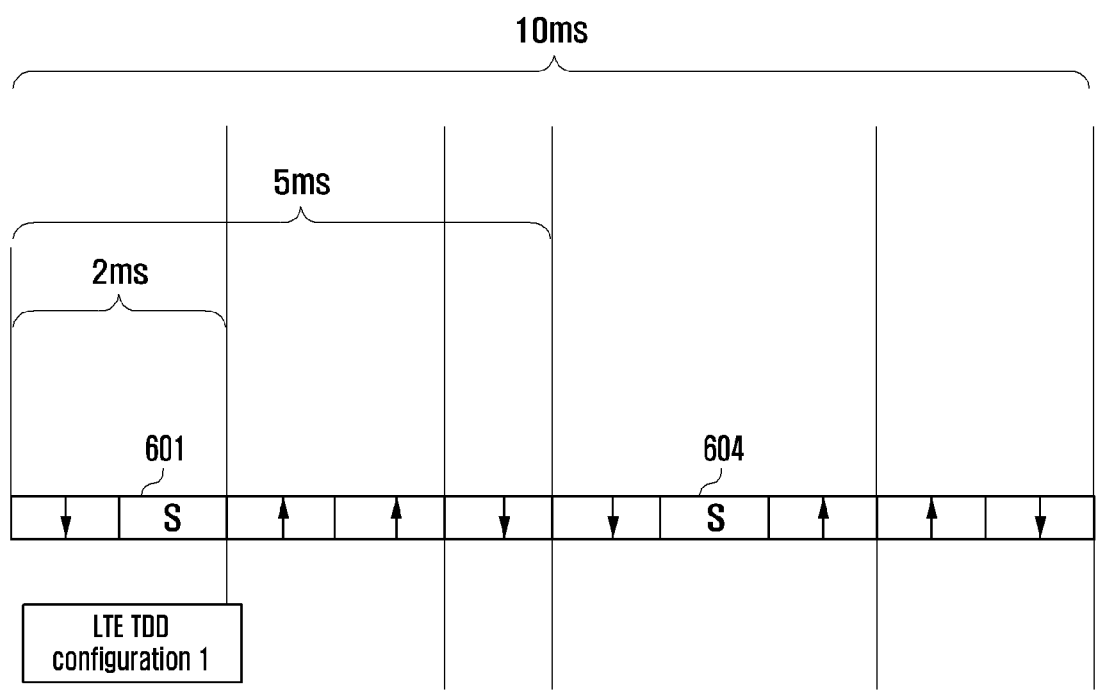
FIG. 6 illustrates an example 1 according to present invention.
Figure 7:
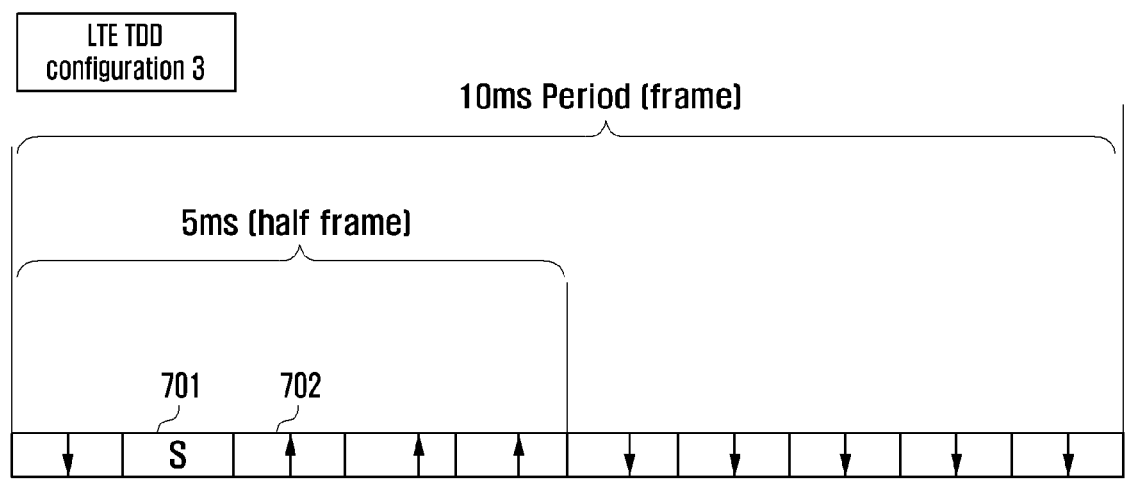
FIG. 7 illustrates an example 2 according to present invention.

The apparatus (406) for transmitting the SRS in LTE UE is illustrated in FIG. 4. The apparatus (406) includes a module (401) which generates an SRS sequence based on the SRS information of designated user received by a module (402) and the other information (such as the cycle offset used to transmit SRS, comb, the bandwidth and so on) received by a module (403). Under the control of a module (404), the power is adjusted by a module (405) in the physical resource allocated at a proper timing and the SRS of designated user is transmitted by using an antenna module (407).

Two examples according to present invention are described as follows. In order to avoid making the description ambiguous, detailed descriptions for known functions are omitted.

A First Example

Configuration 1 (502) in LTE TDD is Applied in this Example

The signal information indicating the SRS transmission of designated user is generated by the LTE network. According to the table 1, the index 635 is selected. For LTE TDD, the index means the period is 2 ms, indicating that the designated user transmits SRS in the first and second symbol in UpPTS (601 or 604). For LTE FDD, the index means that the designated user may use the available OFDM symbol in the first sub-frame in the 2 ms frame to transmit SRS. Then, via the transmission channel mapping and physical channel mapping, the system transmits the index information to the designated user.

A Second Example

Configuration 3 (504) in LTE TDD is Applied in this Example

The signal information indicating the SRS transmission of designated user is generated by the LTE network. According to the table 1, the index 637 which indicates that the period is 2 ms is selected. For LTE TDD, the index means that the designated user transmits SRS in the first symbol (701) and the first normal uplink sub-frame (sub-frame 2) (702). For LTE FDD, the index is reserved by the system and the system doesn't use the index to transmit SRS information of designated user. Then, after the transmission channel mapping and physical channel mapping, the system transmits the index information to the designated user.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for wireless communication, the method comprising:
   determining a number of single-carrier frequency division multiple access (SC-FDMA) symbols in an uplink pilot time slot (UpPTS);
   receiving index information for a sounding reference signal (SRS);
   determining an SRS offset based on the index information; and
   transmitting the SRS based on the SRS offset,
   wherein if the index information includes an integer from 0 to 9,
      if the number of the SC-FDMA symbols in the UpPTS is two, a first symbol is indicated by SRS offset 0 and a second symbol is indicated by SRS offset 1,
      if the number of the SC-FDMA symbols in the UpPTS is one, the first symbol is indicated by the SRS offset 1, and
   wherein if the index information includes the integer from 0 to 9, the SRS is transmitted twice in a period of 5 ms and the SRS offset indicated by the index information is based on:

| Index | Offset |
| --- | --- |
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

2. The method of claim 1, wherein a symbol in a second subframe, a third subframe, and a fourth subframe are indicated by SRS offsets 2, 3, and 4, respectively.

3. The method of claim 1, wherein if the index information includes an integer from 10 to 644, an SRS period is selected among 5 ms, 10 ms, 20 ms, 40 ms, 80 ms, 160 ms, and 320 ms.

4. A method for wireless communication, the method comprising:
   transmitting index information for a sounding reference signal (SRS); and
   receiving the SRS based on an SRS offset that is determined based on the index information,
   wherein if the index information includes an integer from 0 to 9,
      if a number of single-carrier frequency division multiple access (SC-FDMA) symbols in an uplink pilot time slot (UpPTS) is two, a first symbol is indicated by SRS offset 0 and a second symbol is indicated by SRS offset 1,
      if the number of the SC-FDMA symbols in the UpPTS is one, the first symbol is indicated by the SRS offset 1, and
   wherein if the index information includes the integer from 0 to 9, the SRS is received twice in a period of 5 ms and the SRS offset indicated by the index information is based on:

| Index | Offset |
| --- | --- |
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

5. The method of claim 4, wherein a symbol in a second subframe, a third subframe, and a fourth subframe are indicated by SRS offsets 2, 3, and 4, respectively.

6. The method of claim 4, wherein if the index information includes an integer from 10 to 644, an SRS period is selected among 5 ms, 10 ms, 20 ms, 40 ms, 80 ms, 160 ms, and 320 ms.

7. An apparatus for wireless communication, the apparatus comprising:
   a transceiver configured to transmit and receive signals; and
   a controller configured to determine a number of single-carrier frequency division multiple access (SC-FDMA) symbols in an uplink pilot time slot (UpPTS), to determine a sounding reference signal (SRS) offset based on the index information, to control the transceiver to receive index information for an SRS, and to control the transceiver to transmit the SRS based on the SRS offset,
   wherein if the index information includes an integer from 0 to 9,
      if the number of the SC-FDMA symbols in the UpPTS is two, a first symbol is indicated by SRS offset 0 and a second symbol is indicated by SRS offset 1,
      if the number of the SC-FDMA symbols in the UpPTS is one, the first symbol is indicated by the SRS offset 1, and
   wherein if the index information includes the integer from 0 to 9, the SRS is transmitted twice in a period of 5 ms and the SRS offset indicated by the index information is based on:

| Index | Offset |
| --- | --- |
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

8. The apparatus of claim 7, wherein a symbol in a second subframe, a third subframe, and a fourth subframe are indicated by SRS offsets 2, 3, and 4, respectively.

9. The apparatus of claim 7, wherein if the index information includes an integer from 10 to 644, an SRS period is selected among 5 ms, 10 ms, 20 ms, 40 ms, 80 ms, 160 ms, and 320 ms.

10. An apparatus for wireless communication, the apparatus comprising:
a transceiver configured to transmit and receive signals; and
a controller configured to control the transceiver to transmit index information for a sounding reference signal (SRS), and to receive the SRS based on an SRS offset that is determined based on the index information,
wherein if the index information includes an integer from 0 to 9,
if a number of single-carrier frequency division multiple access (SC-FDMA) symbols in an uplink pilot time slot (UpPTS) is two, a first symbol is indicated by SRS offset 0 and a second symbol is indicated by SRS offset 1,
if the number of the SC-FDMA symbols in the one, the first symbol is indicated by the SRS offset 1, and
wherein if the index information includes the integer from 0 to 9, the SRS is received twice in a period of 5 ms and the SRS offset indicated by the index information is based on:

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4. |

11. The apparatus of claim 10, wherein a symbol in a second subframe, a third subframe, and a fourth subframe are indicated by SRS offsets 2, 3, and 4, respectively.

12. The apparatus of claim 10, wherein if the index information includes an integer from 10 to 644, an SRS period is selected among 5 ms, 10 ms, 20 ms, 40 ms, 80 ms, 160 ms, and 320 ms.

* * * * *